United States Patent [19]

Gresens

[11] 3,874,708

[45] Apr. 1, 1975

[54] FLEXIBLE PIPE CONNECTOR FOR MACHINERY PROTECTION

[75] Inventor: Glenn F. Gresens, Baton Rouge, La.

[73] Assignee: H. E. Wiese, Inc., Baton Rouge, La.

[22] Filed: June 25, 1973

[21] Appl. No.: 373,372

[52] U.S. Cl. .................................. 285/93, 285/226
[51] Int. Cl. ........................ F16l 35/00, F16l 51/02
[58] Field of Search ................ 285/93, 226, 49, 156

[56] References Cited
UNITED STATES PATENTS

| | | | |
|---|---|---|---|
| 2,787,124 | 4/1957 | Donahue | 285/226 X |
| 3,036,148 | 5/1962 | Swerdlow | 285/226 X |
| 3,299,417 | 1/1967 | Sibthorpe | 285/93 X |
| 3,453,716 | 7/1969 | Cook | 285/156 X |

FOREIGN PATENTS OR APPLICATIONS

| | | | |
|---|---|---|---|
| 1,096,461 | 12/1967 | United Kingdom | 285/49 |

Primary Examiner—Jordan Franklin
Assistant Examiner—Peter Nerbun
Attorney, Agent, or Firm—Burmeister, Palmatier & Hamby

[57] ABSTRACT

The illustrated connecting device is adapted to provide a flexible connection between a pipeline and a pump, compressor, engine, vessel, reactor, or another pipeline, or any other machine, device or equipment to protect the equipment against stresses and strains due to the fluid pressure in the pipeline, and also due to thermal expansion and contraction in the pipeline. The connecting device also protects the equipment against other forces and vibrations which might otherwise be transmitted to the equipment by the pipeline. The transmission of vibrations from the equipment to the pipeline is also minimized. In addition, the connecting device reduces the transmission of noise in both directions between the equipment and the pipeline. The connecting device may comprise a casing having first and second diametrically opposite portions and a third portion extending generally perpendicular to the first and second portions. A pipeline coupling section extends into the first portion of the casing and is rigidly connected thereto. A conduit is disposed within the casing and is provided with first and second diametrically opposite conduit sections and a third conduit section extending generally perpendicular to the first and second sections. A first flexible bellows is connected between the first section of the conduit and the pipeline coupling section. A second flexible bellows is connected between the second conduit section and a blind pipe section connected to the second portion of the casing. The equipment is adapted to be connected to an equipment-connecting section which is rigidly connected to the third section of the conduit. A third flexible bellows is connected between the equipment-connecting section and the third portion of the casing. The third bellows provide flexibility between the equipment-connecting section and the casing, while preventing the transmission of forces to the equipment due to the fluid pressure in the pipeline.

10 Claims, 1 Drawing Figure

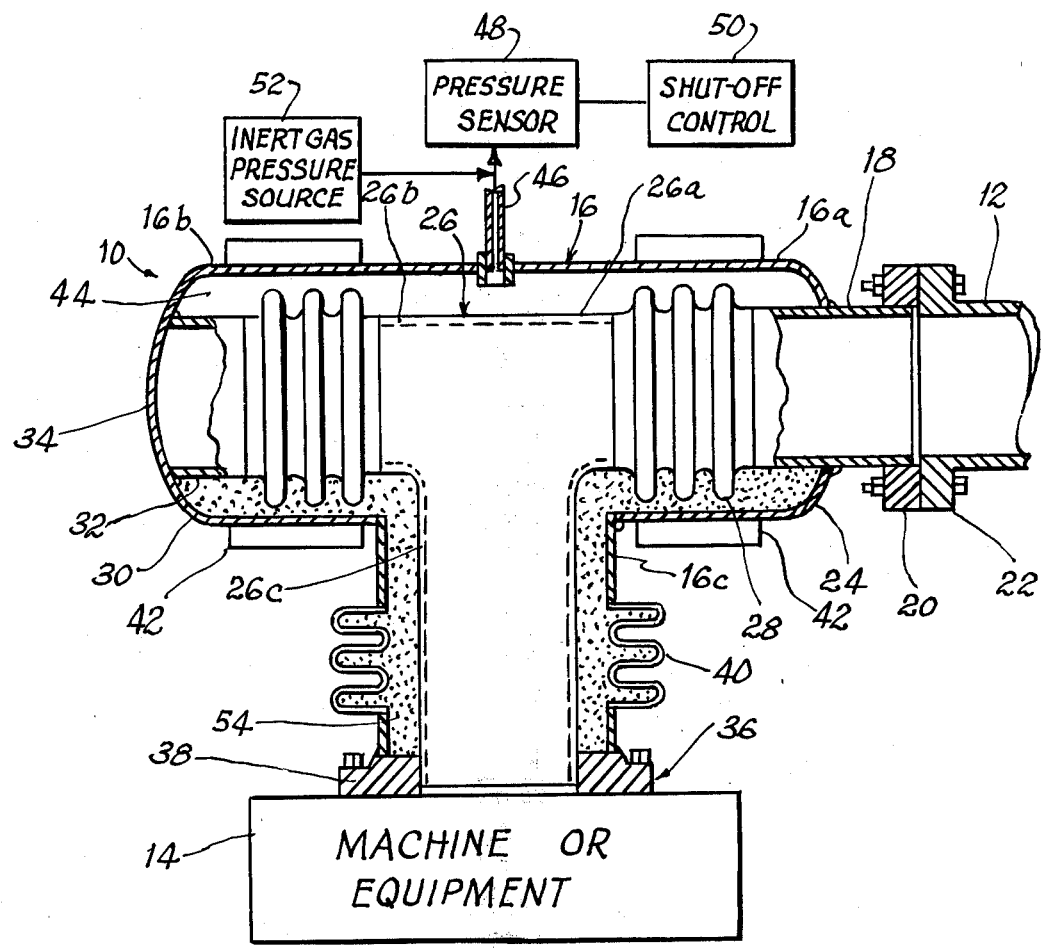

FLEXIBLE PIPE CONNECTOR FOR MACHINERY PROTECTION

This invention relates to a flexible connecting device which is particularly advantageous for use between a pipeline and a pump, compressor, engine, vessel, reactor or another pipeline, or any other device or equipment. As used herein, the term machine or the term equipment should be regarded as including any suitable machine, device or equipment to which a pipeline may be connected, including another pipeline.

One object of the present invention is to provide a new and improved flexible connecting device which prevents the transmission of forces to a machine or the like due to the fluid pressure in the pipeline, so that the machine is protected against stresses, strains, thrusts and moments which might otherwise be caused by such forces.

A further object is to provide a flexible connecting device which protects the machine or the like against forces due to thermal expansion and contraction in the pipeline.

Another object is to provide a flexible connecting device which minimizes the transmission of vibrations and noise in either direction between the machine and the pipeline.

Further objects, advantages and features of the present invention will appear from the following description, taken with the accompanying drawing, in which the single FIGURE is a somewhat diagrammatic sectional view taken through a flexible connecting device to be described as an illustrative embodiment of the present invention.

It will be seen that the drawing illustrates a flexible connecting device 10 adapted to be employed between the pipeline 12 and a machine or equipment 14, such as a pump, compressor, engine, vessel, reactor, another pipeline, or the like.

The connecting device 10 comprises a casing 16 having first and second diametrically opposite portions or legs 16a and 16b, and also a third portion or leg 16c extending transversely to the first and second portions 16a and 16b and preferably perpendicular thereto. A pipeline coupling section 18 extends into the first 16a 16a of the casing 16 and is rigidly welded or otherwise connected thereto.

As shown, the pipeline coupling section 18 is provided with a coupling flange 20 which may be bolted or otherwise clamped to a similar flange 22 on the pipeline 12. Any other suitable means may be employed to connect the pipeline 12 to the coupling section 18. In this case, the pipeline coupling section 18 is in the form of a pipe section extending through an endwall 24 of the casing 10 and welded or otherwise rigidly secured thereto.

A conduit or pipe assemblage 26 is disposed within the casing 16. It will be seen that the conduit 26 comprises first and second diametrically opposite sections 26a and 26b and also a third transverse section 26c preferably extending perpendicular to the first and second sections 26a and 26b. The casing 16 and the conduit 26 may be made of metal or any other suitable material.

A first flexible bellows 28 is preferably connected between the pipeline coupling section 18 and the first section 26a of the conduit 26. A second flexible bellows 30 is preferably connected between the second section 26b of the conduit 26 and a blind pipe section 32 connected to the second portion 16b of the casing 16. The blind pipe section 32 may be connected to an endwall 34 of the casing 16 diametrically opposite from the endwall 24.

The third or perpendicular section 26c of the conduit 26 is preferably connected to the machine 14 in a rigid manner by a machine-coupling section 36. As shown, the machine-coupling section 36 includes a coupling flange 38 adapted to be bolted or otherwise secured to the machine 14, or some other device, including another pipeline.

A third flexible bellows 40 is preferably connected between the machine-coupling section 36 and the third portion 16c of the casing 16. All of the flexible bellows 28, 30 and 40 are preferably made of metal or some other suitable material.

The casing 16 is preferably mounted in such a way that it is immovable relative to the pipeline 12. In this case, the casing 16 is held against movement by one or more anchors or base members 42.

It will be evident that there is a space 44 within the casing 16 and between the casing and the conduit 26. A pipe or tube 46 is preferably connected to the casing 16 and is in communication with the space 44. The pipe 46 may serve as a pressure tap connected to a pressure sensor 48 which may comprise a pressure gauge or a pressure-responsive switch or other control device. The pressure sensor 48 may be employed to detect any leakage into the space 44 from the conduit 26 or the bellows 28 and 30.

The pressure sensor 48 may be connected to a shutoff control device 50 adapted to perform various functions if there is any significant change in the pressure within the space 44. For example, the control device 50 may be employed to shut off the machine 14 or to actuate an alarm signal such as a bell, buzzer or light.

To provide for detection of leaks in the casing 16, it is preferred to pressurize the space 44 between the casing 16 and the conduit 26. For this purpose, a pressure source 52 may be connected to the pipe 46. Such pressure source 52 may be adapted to supply nitrogen or some other inert gas. When the space 44 has been pressurized, the inert gas pressure source 52 may be turned off or disconnected from the casing. If the casing 16 springs a leak, the inert gas pressure within the casing 16 will drop. The pressure sensor 48 may comprise a pressure-responsive switch or some other control device adapted to be operated in response to any such drop in pressure. Thus, if the pressure in the space 44 either rises or drops significantly, the shutoff control device 50 may be actuated by the pressure sensor 48 so that the machine 14 will be stopped.

The connecting device 10 provides flexibility between the machine or equipment 14 and the casing 16 so that appreciable movement can occur between these elements without producing excessive stresses in the equipment or the connecting device. Similarly, the flexibility afforded by the connecting device 10 can accommodate relative vibratory movement between the machine or equipment 14 and the casing 16.

The bellows 40 provides flexibility between the maching-coupling section 36 and the casing section 16c. The bellows 28 and 30 provide flexibility between the conduit section 26c and the pipe sections 18 and 32.

The conduit 26 within the casing 16 is balanced with respect to the fluid pressure within the conduit so that the fluid pressure does not tend to cause movement of the conduit. Accordingly, the fluid pressure within the conduit 26 does not cause any elongation of the bellows 40 or any stress therein. Likewise, the fluid pressure within the conduit 26 does not cause any elongation of the bellows 28 and 30 or any stress therein. Because both the pipeline coupling section 18 and the blind pipe section 32 are connected to the casing 16, any force exerted by the pipeline 12 does not cause elongation or compression of the bellows 28 and 30.

The flexible connecting device 10 minimizes the transmission of vibration and noise in both directions between the machine or equipment 14 and the pipeline 12. If desired, a vibration damping material may be provided within the space 44 between the casing 16 and the conduit 16. Such vibration damping material may comprise any suitable granular, fibrous or foam type material, such as sand, vermiculite, asbestos, rock wool, glass fibers, granular or foamed plastic materials or the like.

It will be evident that the flexible connecting device of the present invention will isolate and protect machinery and equipment such as pumps, compressors, other pipelines, vessels, reactors and the like from force, thrust and moments that might otherwise be developed by the piping systems connected to such equipment or machinery. Moreover, the connecting device protects the machinery or equipment from the effects of the high pressures and temperatures which otherwise cause stresses between the piping system and the equipment.

The connecting device of the present invention also provides a vibration absorbing link which will minimize the transfer of vibrations in either direction between the equipment and the piping system. The connecting device of the present invention also serves as a nodal point whereby vibrations generated by the fluid flow through the piping system can be restricted to predetermined areas of the system. Noise is also attenuated by the connecting device so that the transmission of noise is minimized in both directions between the piping system and the equipment or machinery.

The flexible connecting device of the present invention is easy to manufacture and low in cost. The flexibility of the device can be varied to suit individual applications by varying the size and number of convolutions in the bellows elements.

The casing of the flexible connecting device is preferably anchored in a rigid manner to a footing, foundation or the like. The casing and the anchoring device are preferably strong enough to resist all forces and movements occurring in the pipeline without appreciable deflection. By virtue of the bellows 28, 30 and 40, the machine or equipment is free to move relative to the casing 16 and the pipeline 12. Thus, the flexible connecting device is able to accommodate appreciable movement which may be associated with the normal operation of the machine or equipment.

Thermal expansion or other forces in the external pipeline 12 do not move or deflect the bellows elements 28, 30 and 40, but instead are firmly resisted by the casing 16 and its anchoring means 42. These forces in the pipe 12 are thus caused to react upon and are absorbed by other flexible elements in the piping system. With this arrangement, the bellows elements 28, 30 and 40 of the flexible coupling device are acted upon by only the small forces and deflections resulting from thermal expansion between the mounting point of the machine or equipment 14 and the mounting point of the casing 16, and also by any vibration of the machine or equipment.

Inasmuch as the bellows elements 28 and 30 are enclosed within the casing 16, any failure of the bellows elements 28 and 30 will not result in the escape of any flammable, toxic, or otherwise harmful fluid because such fluid will be contained by the casing 16. The pressure sensor 48 will detect any such failure of the bellows elements 28 and 30 by indicating the excess pressure which develops within the casing due to leakage of the pressure fluid through the fractured wall of the bellows element. The control device 50 will then shut down the machine or equipment 14 and will also preferably actuate an alarm signal.

A wide range of vibration damping characteristics can be obtained by using various vibration damping materials in the space 44 between the casing 16 and the conduit 26, and by varying the amount of vibration damping material in such space. In the drawing, a granular vibration damping material 54 is illustrated as partially filling the space 44.

I claim:

1. A flexible connecting device for use between a pipeline and a machine or equipment,
   comprising a casing having first and second diametrically opposite portions and a third portion extending transversely to said first and second portions,
   a pipeline connecting pipe section extending into said first portion of said casing,
   means forming a substantially rigid sealed joint between said pipeline connecting pipe and said first portion of said casing,
   a blind pipe section connected with another substantially rigid sealed joint to said second portion of said casing and disposed therein,
   conduit means disposed within said casing and having first and second diametrically opposite conduit sections and a third conduit section extending transversely to said first and second conduit sections,
   a first flexible bellows connected between said pipeline connecting pipe section and said first conduit section,
   a second flexible bellows connected between said blind pipe section and said second conduit section,
   an equipment-connecting section secured to said third conduit section with another substantially rigid sealed joint,
   and a third flexible bellows connected at opposite ends to said equipment-connecting section and to said third portion of said casing.

2. A device according to claim 1,
   in which said third portion of said casing is substantially perpendicular to said first and second portions,
   said third conduit section being substantially perpendicular to said first and second conduit sections.

3. A device according to claim 1,
   in which said first, second and third bellows are made of metal.

4. A device according to claim 3,
   in which said casing, conduit, connecting sections and blind section are made of metal.

5. A device according to claim 1, including anchor means connected to said casing to secure said casing against movement.

6. A device according to claim 1, in which said casing has a space therein between said casing and said conduit,
said device including a pressure sensor connected to said space for detecting any changes in the pressure in said space as an indication of possible leakage.

7. A device according to claim 6, including a fluid pressure source for pressurizing said space whereby any decrease in the pressure within said space will be indicative of leakage from said casing,
any increase in the pressure in said space being indicative of leakage between said conduit and said casing.

8. A device according to claim 1, including a vibration damping material disposed in said casing between said caing and said conduit.

9. A device according to claim 1, in which said casing, conduit and bellows are made of metal,
said third portion of said casing being substantially perpendicular to said first and second portions,
said third conduit section being disposed within said third portion of said casing and being substantially perpendicular to said first and second conduit sections.

10. A device according to claim 9, in which said casing has a space therein between said casing and said conduit,
said device including a pressure sensor for detecting any change in the pressure in said space as an indication of leakage into or out of said space.

* * * * *